(No Model.) 4 Sheets—Sheet 1.
R. P. CURTIS.
MACHINE FOR SIMULTANEOUSLY THREADING A PLURALITY OF BOLTS.
No. 437,291. Patented Sept. 30, 1890.
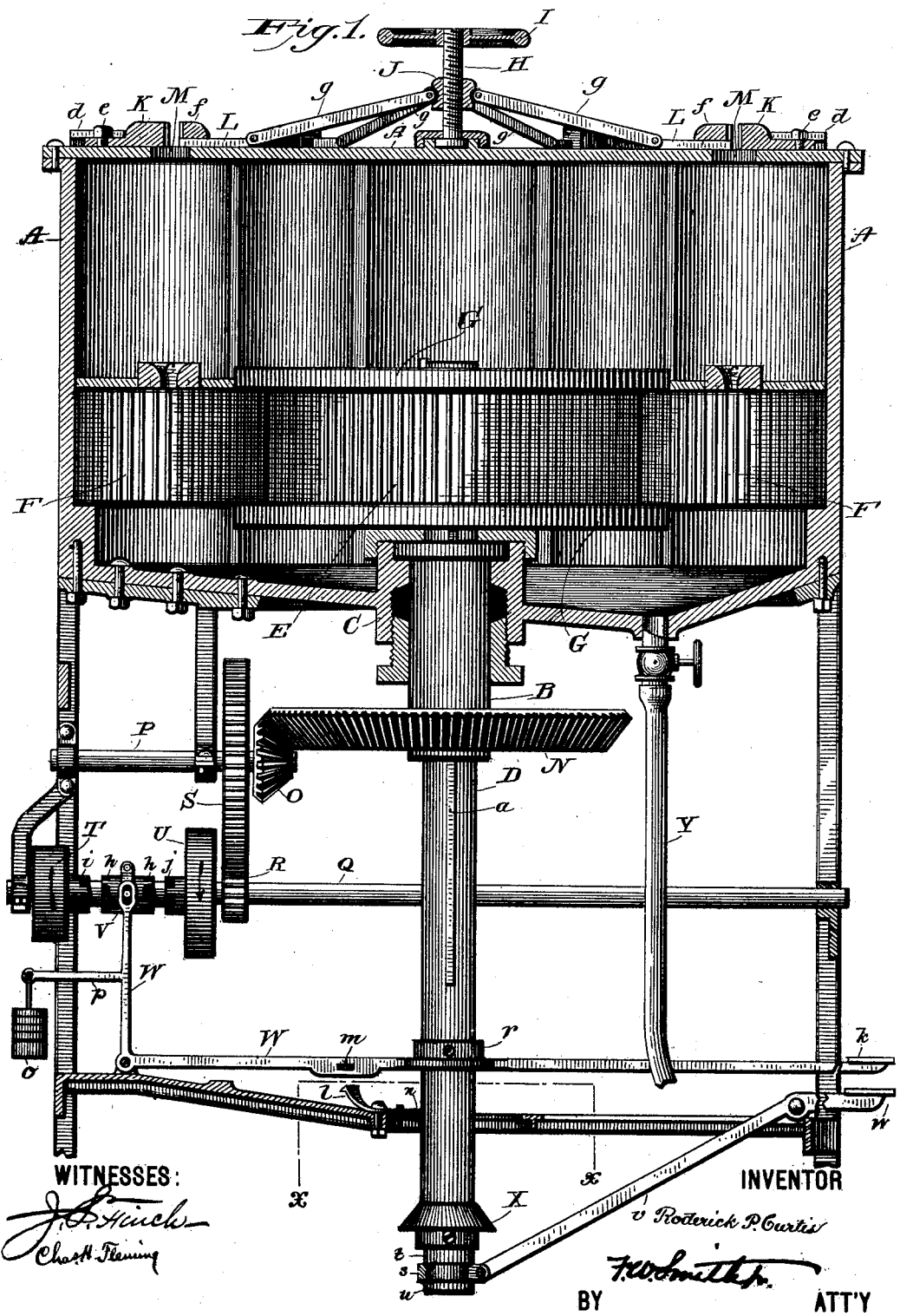

(No Model.) 4 Sheets—Sheet 2.
R. P. CURTIS.
MACHINE FOR SIMULTANEOUSLY THREADING A PLURALITY OF BOLTS.
No. 437,291. Patented Sept. 30, 1890.
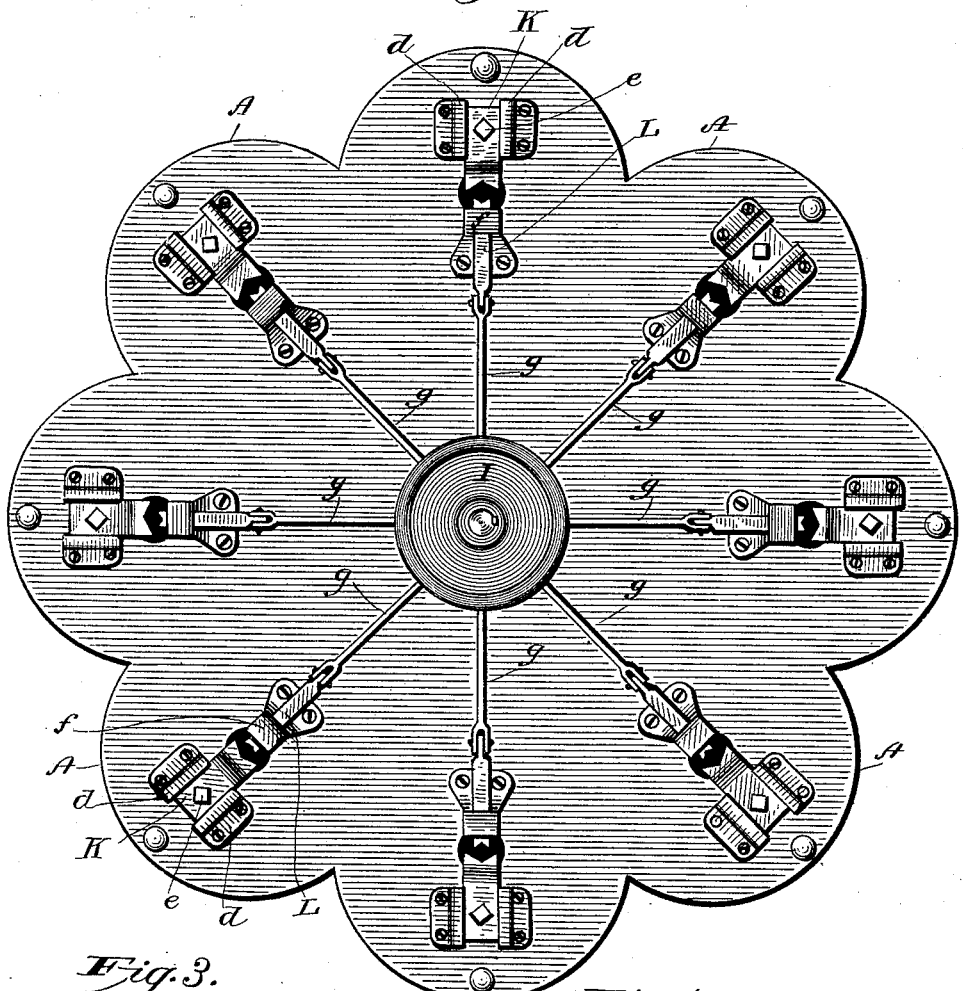
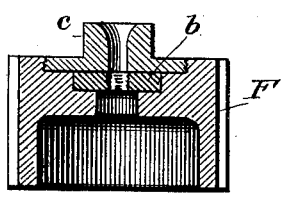
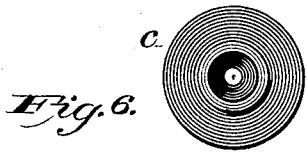
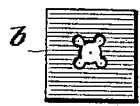
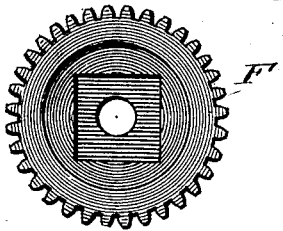
WITNESSES: 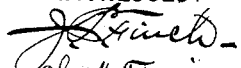 
INVENTOR
Roderick P. Curtis
BY ATT'Y (No Model.) 4 Sheets—Sheet 3.

R. P. CURTIS.
MACHINE FOR SIMULTANEOUSLY THREADING A PLURALITY OF BOLTS.

No. 437,291. Patented Sept. 30, 1890.

WITNESSES:
J. S. Finch
Chas. H. Fleming

INVENTOR
Roderick P. Curtis.

BY F. W. Smith. ATT'Y (No Model.) 4 Sheets—Sheet 4.
R. P. CURTIS.
MACHINE FOR SIMULTANEOUSLY THREADING A PLURALITY OF BOLTS.
No. 437,291. Patented Sept. 30, 1890.
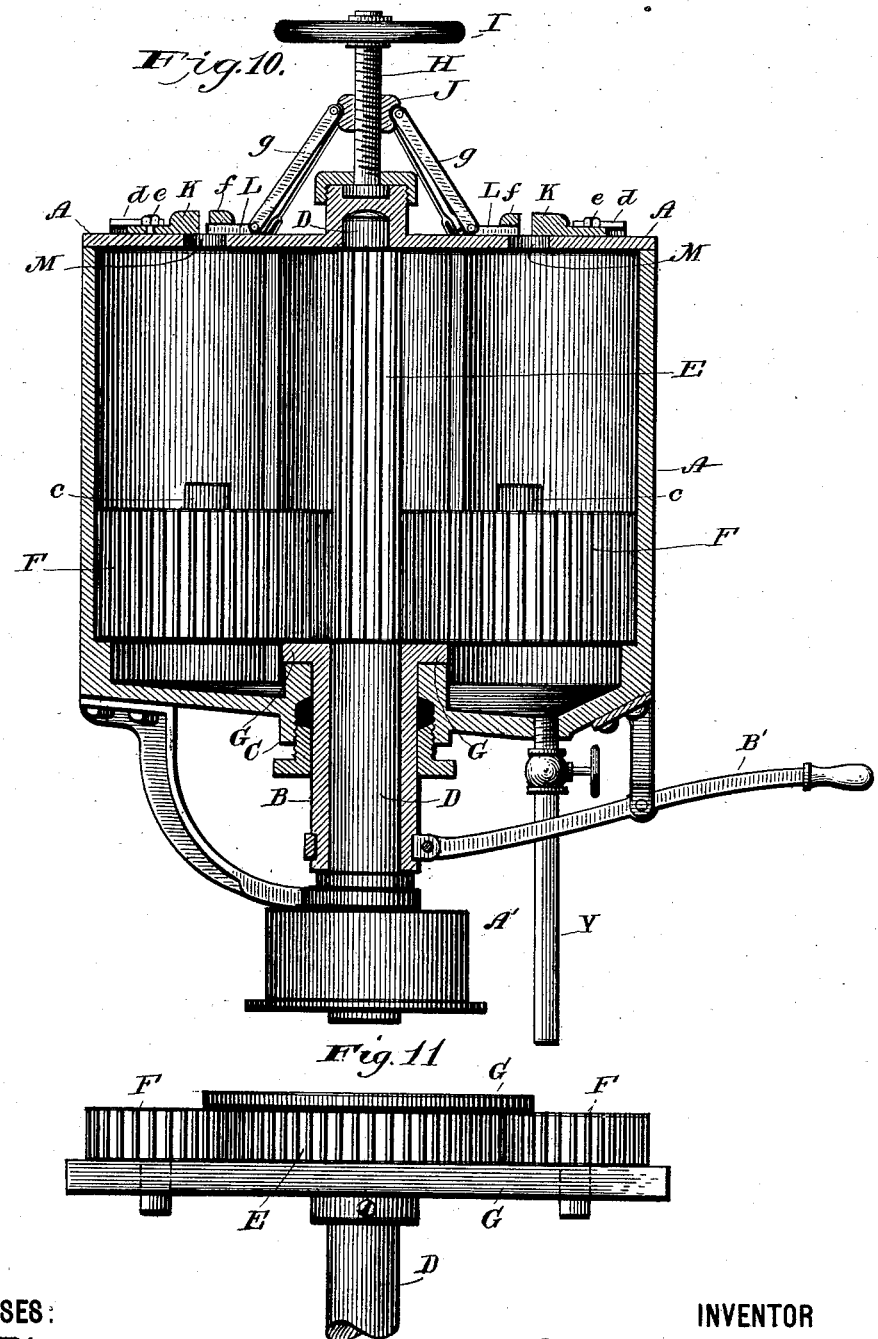
WITNESSES:
INVENTOR
Roderick P. Curtis
BY ATT'Y

UNITED STATES PATENT OFFICE.

RODERICK P. CURTIS, OF SOUTHPORT, ASSIGNOR TO CURTIS & CURTIS, OF BRIDGEPORT, CONNECTICUT.

MACHINE FOR SIMULTANEOUSLY THREADING A PLURALITY OF BOLTS.

SPECIFICATION forming part of Letters Patent No. 437,291, dated September 30, 1890.

Application filed December 12, 1889. Serial No. 333,434. (No model.)

*To all whom it may concern:*

Be it known that I, RODERICK P. CURTIS, a citizen of the United States, residing at Southport, in the county of Fairfield and State of Connecticut, have invented certain new and useful Improvements in Machines for Simultaneously Threading a Plurality of Bolts; and I do hereby declare the following to be a full, clear, and exact description of the invention, such as will enable others skilled in the art to which it appertains to make and use the same.

My invention relates to certain new and useful improvements in machines for threading bolts, and has for its object to thread many bolts simultaneously in the same time that it ordinarily takes to thread a single bolt.

With these ends in view my invention consists in the details of construction and combination of elements, such as will be hereinafter fully set forth, and then specifically designated by the claims.

Figure 7:
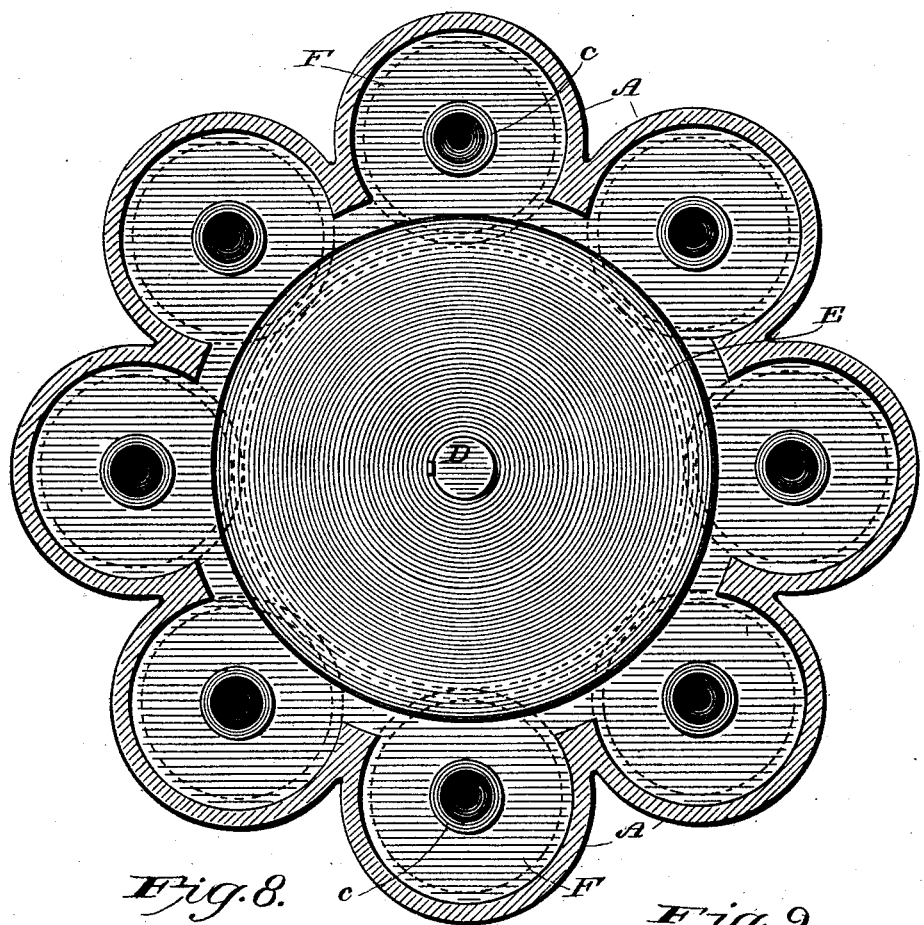
Figure 8:
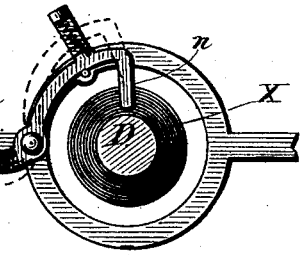
Figure 9:
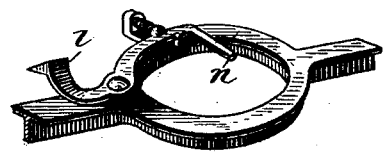

In the accompanying drawings, Figure 1 is a sectional elevation of my improved bolt-threading machine; Fig. 2, a plan view; Fig. 3, a detail sectional elevation of one of the die-carrying gears; Fig. 4, a detail front elevation of the guide-hub which is secured within the face of the die-carrying gears; Fig. 5, a detail elevation showing an ordinary thread-cutting die such as I prefer to use; Fig. 6, a detail front elevation of the die-carrying gear with the die and guide-hub removed; Fig. 7, a plan of my improved machine with the top plate removed; Fig. 8, a section at the line $x$ $x$ of Fig. 1; Fig. 9, a detail perspective of the mechanism which locks the clutch-operating lever; Fig. 10, a sectional elevation of a slightly-modified construction of my improvement, and Fig. 11 a detail broken elevation showing the die-carrying gears journaled within bearings in a supporting-platen.

Similar letters denote like parts in the several figures of the drawings.

A is the casing, and B a sleeve journaled within an ordinary stuffing-box C at the bottom of the casing in such a manner that said sleeve is capable of a free rotary movement, but is stationary as to longitudinal movement. D is a shaft splined to said sleeve interior thereof, the spline being denoted by the letter $a$, said shaft having a lengthwise play within the sleeve. E is a cog-wheel rigidly mounted on the inner end of said shaft within the casing, and F are die-carrying gears which are arranged radially with respect to the cog E and mesh with the latter. These gears F preferably have no journal-bearings, but are perfectly free within the casing, the latter being shaped as shown at Fig. 7, so as to afford close-rim bearings for said gears, which have a free play within said bearings.

G are cheek-pieces which embrace the gears F above and below and are secured to the shaft D, so that it will be readily understood that the vertical movement of said shaft will cause said gears to be raised within their bearings for the purpose presently explained. Concerning these cheek-pieces I would say that it is immaterial whether they have a rotary movement independent of the shaft or not, it being necessary only that they should not be capable of any sliding movement along said shaft.

Each of the die-carrying gears is provided with a threading-die $b$ and a superimposed guide-hub $c$; but I do not wish to be limited by any construction or arrangement of threading-dies, since my present invention does not comprehend them, and solid or sectional dies may be used, if desired; also, the guide-hub may be dispensed with.

H is a threaded spindle journaled within the top of the casing A and provided with a hand-wheel I. This spindle is free to revolve, but has no lengthwise movement within its bearings.

J is a nut adapted to travel along the spindle.

K L are clamping-jaws for holding the bolts during the operation of threading, the jaws K being adjustable within the bearings $d$, a set-nut $e$ serving to secure them in any adjustment, while the jaws L have a free sliding movement within the bearings $f$ and are connected to the nut J by intermediate pivoted levers $g$.

M are openings through the top of the casing, through which the bolts are inserted, the clamping being effected by turning the wheel I so as to drive the nut J down along the spindle H, whereby the jaws L are forced firmly against the bolts.

Various kinds of mechanism can be contrived for revolving and raising the shaft D, and as the gist of my invention resides in the broad idea of giving to the die-carrying gears the movements above set forth I do not wish to be limited to any particular means for revolving and raising said shaft, and such means as I have shown for this purpose merely illustrate one of the many practical ways in which my invention may be carried out. In fact it is not necessary that the shaft and central cog should have a vertical movement, as will be seen from the modification shown at Fig. 10, which I will hereinafter describe.

N is a beveled gear tightly mounted on the sleeve B and meshing with a bevel-gear O on a counter-shaft P.

Q is the power-shaft journaled within the frame of the machine, and R is a cog on said shaft and meshing with a cog S on the counter-shaft P.

T U are pulleys loose on the shaft Q and belted up in the usual manner (not shown) so as to revolve in opposite directions.

V is a collar splined on the shaft Q and having clutch-teeth $h$ at both ends. This collar is between the pulleys T U and is capable of being reciprocated in opposite directions along the shaft, whereby engagement may be effected with the clutch-teeth $i\ j$ on the hubs of the said pulleys in order to impart motion to said shaft first in one direction and then in the other. Loosely connected to the said collar V is an L-shaped lever W, which is pivoted at its angle-point to the frame of the machine and is extended forward and is provided with a foot-tread $k$. This lever loosely encircles the shaft D, and when depressed is engaged by the spring-catch $l$, pivoted to the frame of the machine, a notch $m$ being formed within said lever, within which the nose of the catch enters. This catch is shown in detail in Figs. 8 and 9 and is of the nature of an ordinary spring-latch. A tail $n$ projects inward from the rear end of said catch, and a beveled collar X is secured to the shaft D, whereby when said shaft is raised the collar will strike said tail and thereby withdraw the catch from the lever W, for the purpose presently explained.

A weight $o$ is applied at the end of an arm $p$, which extends rearward from the heel of the lever W, whereby the collar V will be engaged with the pulley T when said lever has been released by the collar X, as previously set forth.

A collar $r$, secured to the shaft D above the lever W, rests upon the latter when the shaft is in its normal position, in order to throw the clutch-collar midway between the pulleys T U, for the purpose and in the manner presently explained.

$s$ is a collar swiveled on the shaft D between the shoulders $t\ u$ thereon, and $v$ is a lever pivoted to the frame of the machine, the lower end of said lever being pivoted to said collar, while the other end is provided with a foot-tread $w$.

The operation of my improvement is as follows: Bolts having been introduced within the openings M and clamped by manipulation of the hand-wheel I, the operator depresses the treadle $k$, thereby engaging the clutch-collar V with the pulley U and effecting the revolution of the die-carrying gears F and locking said clutch and pulley by the engagement of the spring-catch $l$ with the lever W in the manner previously set forth. The operator then depresses the treadle $w$, thereby raising the shaft D and elevating the die-carrying gears until their threading-dies have started the thread on the bolts, when the operation of threading the bolts will itself draw the gears and shaft upward, the location of the beveled collar X on the shaft being such that when the required depth of thread on the bolts has been reached said collar will strike the tail $n$ of the catch $l$, and thereby release the clutch from the pulley U, thus allowing the weight $o$ to bring the clutch into engagement with the pulley T, whereby the threading-dies will be reversed as to their movement and backed off from the threaded bolts. When the shaft D in its downward movement has reached its normal position, the collar $r$ will have depressed the lever W, so as to withdraw the clutch V from the pulley T to a position about midway between the pulleys T U, thus bringing the machine to a state of rest and the several parts in the position necessary for the threading of subsequent bolts. The collar X is adjustable to act sooner or later on the catch $l$, according to the depth of thread required.

The casing may be filled with oil, if desired, a pipe Y being provided for drawing off the oil and metal chips.

The lower cheek-piece G may extend beneath the die-carrying gears to constitute a platen, within which latter bearings may be formed for said gears; but said cheek-piece would in this instance be loose on the shaft in order that said gears should be capable of an axial revolution only, all of which will be clearly understood by reference to Fig. 11.

In Fig. 10 I have shown the central cog E elongated, the shaft D being stationary in its bearings, while a single actuating-pulley A' is rigidly mounted on the outer end of said shaft. In this instance the sleeve B is capable of a free movement along the shaft, while the top of the said sleeve is formed into a supporting cheek-plate for the die-carrying gears, said sleeve being operated by a hand-lever B' in the usual manner. The lever B' is depressed to raise the sleeve until the die-carrying gears are sufficiently elevated so that the threading-dies will engage the bolts, when the operation of threading said bolts will of itself draw the gears upward along the elongated central cog. When the bolts are threaded, the movement of the pulley A' is reversed by means of any ordinary reversing or shifting mechanism, (not shown,) thereby returning the gears to normal position and withdrawing the bolts from the threading-dies. This modification merely demonstrates the fact that it is not essential that the central cog should have a reciprocatory movement, the gist of my invention resting in the broad idea of a plurality of die-carrying gears revolved simultaneously from a single operating-cog, and having a synchronous reciprocatory movement in a line parallel with their axes.

Having thus described my invention, what I claim as new, and desire to secure by Letters Patent, is—

1. A machine for simultaneously threading a plurality of bolts, comprising a plurality of die-carrying gears, a single operating-cog wheel adapted to impart simultaneous action to said gears, and the means for synchronously reciprocating said gears in a line parallel to their axes, substantially as set forth.

2. In a machine for threading a plurality of bolts, a series of die-carrying gears capable of a synchronous movement in a line parallel with their axes, in combination with the means for imparting to said gear simultaneous rotation, substantially as set forth.

3. In a machine of the character set forth, the combination, with a series of die-carrying gears and a single operating-cog, of a cheek-piece or platen supporting said gears, and the means for raising said cheek-piece or platen, substantially as set forth.

4. In a machine of the character described, the combination, with a series of die-carrying gears, a single central operating-cog, and upper and lower cheek-plate, on the shaft of said cog and embracing said gears, of the means for reciprocating said shaft, substantially as shown and described.

5. In a machine of the character described, the combination, with a single centrally-arranged operating-cog, of a series of die-carrying gears located radially around said cog and meshing therewith, a casing surrounding said cog and gears and provided with bearings for the latter, a reciprocatory shaft to which said cog is secured, and cheek-pieces on said shaft extending above and below said gears, substantially as shown and set forth.

In testimony whereof I affix my signature in presence of two witnesses.

RODERICK P. CURTIS.

Witnesses:
F. W. SMITH, Jr.,
J. P. FINCH.